United States Patent [19]

Bernhardt et al.

[11] Patent Number: 5,158,796

[45] Date of Patent: Oct. 27, 1992

[54] POLYOL FATTY ACID POLYESTER COMPOSITIONS WITH IMPROVED TASTE

[75] Inventors: Christian A. Bernhardt, Fairfield; Harry M. Taylor, Cincinnati, both of Ohio

[73] Assignee: The Procter & Gamble Company, Cincinnati, Ohio

[21] Appl. No.: 725,923

[22] Filed: Jul. 3, 1991

Related U.S. Application Data

[63] Continuation of Ser. No. 593,603, Oct. 4, 1990, abandoned, which is a continuation of Ser. No. 403,558, Sep. 6, 1989, abandoned, which is a continuation of Ser. No. 146,648, Jan. 21, 1988, abandoned, which is a continuation-in-part of Ser. No. 831,397, Feb. 20, 1986, abandoned.

[51] Int. Cl.$^5$ .......................... A23D 7/00; A21D 8/00
[52] U.S. Cl. ................................... 426/549; 426/589; 426/601; 426/603; 426/606; 426/804; 426/654
[58] Field of Search ............... 426/549, 589, 601, 603, 426/606, 804, 654

[56] References Cited

U.S. PATENT DOCUMENTS

| | | | |
|---|---|---|---|
| 3,158,490 | 11/1964 | Baur et al. | |
| 3,600,186 | 8/1971 | Mattson et al. | 426/607 |
| 3,649,647 | 3/1972 | Ota et al. | |
| 4,005,195 | 1/1977 | Jandacek | 424/180 |
| 4,005,196 | 1/1977 | Jandacek et al. | 424/180 |
| 4,034,083 | 7/1977 | Mattson | 424/180 |
| 4,446,165 | 5/1984 | Roberts | 426/602 |
| 4,508,746 | 4/1985 | Hamm | 426/601 |
| 4,626,441 | 12/1986 | Wolkstein | 426/548 |
| 4,789,664 | 12/1989 | Seligson et al. | 426/574 |
| 4,797,300 | 1/1989 | Jandacek et al. | |
| 4,810,516 | 3/1989 | Kong-Chan | 426/548 |
| 4,835,001 | 5/1989 | Mijac et al. | 426/556 |
| 4,880,657 | 11/1989 | Guffey et al. | |
| 4,940,601 | 7/1990 | Orphanos et al. | 426/601 |
| 4,960,602 | 10/1990 | Talkington et al. | 426/534 |
| 4,962,092 | 10/1990 | Wood, Jr. | 514/23 |
| 5,017,398 | 5/1991 | Jandacek et al. | 426/603 |
| 5,021,256 | 6/1991 | Guffey et al. | 426/601 |

FOREIGN PATENT DOCUMENTS

| | | |
|---|---|---|
| 0233856 | 8/1976 | European Pat. Off. |
| 0235836 | 9/1987 | European Pat. Off. ............ 13/6 |
| 0236288 | 9/1987 | European Pat. Off. |
| 0287157 | 10/1988 | European Pat. Off. |
| 0287158 | 10/1988 | European Pat. Off. |
| 0290065 | 11/1988 | European Pat. Off. |
| 0290216 | 11/1988 | European Pat. Off. |
| 0290421 | 11/1988 | European Pat. Off. |
| 0311154 | 4/1989 | European Pat. Off. |
| 21944 | 4/1988 | Philippines. |
| 25847 | 12/1991 | Philippines. |

OTHER PUBLICATIONS

Fallat et al., "Short Term Study of Sucrose Polyester . . .", Am. J. Clin. Nutr. 29, pp. 1204–1215 (Nov. 1976).
Mattson et al., "The Effect of a Non Absorbable Fat . . .", J. Nutrition 109, #10, pp. 1688–1693 (Oct. 1979).
Mattson et al., "The Effect of a Non Absorbable Lipid . . .", J. Nutrition 106, #6, pp. 747–752 (Jun. 1976).
Swern, *Bailey's Industrial Oil and Fat Products*, 3rd Ed., pp. x, 249–251, 265 and 317 (1964), Interscience Publishers, N.Y.
Madison and Hill, *JAOCS*, vol. 55, pp. 328–331 (1978).
Weiss, Food Oils and Their Uses, Avi Publishing Co., Westport, Conn., 2nd Edition, pp. 16, 195–197 (1983).
Olestra Food Additive Petition (Procter & Gamble), filed with the F.D.A. on Apr. 1, 1987, available to the public on May 7, 1987, Appendix A-6 and A-7.
Federal Register, vol. 52, No. 120, Jun. 23, 1987, p. 23606, Notices.
Idson, "Rheology: Fundamental Concepts", Cosmetics and Toiletries, vol. 93, pp. 23–30 (Jul. 1978).
Freling, "Monitor Batch Quality with Rheograms", Instrumentation Technology, pp. 41–45 (Jun. 1972).
"Instruction for Using the SW 60 Ti Rotor", Beckman Instruments, Inc., Palo Alto, Calif., pp. 1, 5, 6 (Apr. 1984).
Olestra Food Additive Petition (Procter & Gamble), published May 7, 1987, pp. 1, 3, 21, 22, 23, 24, 31, 32, 44 and 57.
Chester et al., "Separation of Sucrose Polyesters . . . ", Analytical Chemistry, vol. 57, No. 12, Oct. 1985, pp. 2243–2247.

*Primary Examiner*—Joseph Golian
*Assistant Examiner*—Evan Federman
*Attorney, Agent, or Firm*—Jacobus C. Rasser; Ronald L. Hemingway; Gary M. Sutter

[57] ABSTRACT

The present invention is a composition of matter comprising: (a) an edible, non-absorbable, non-digestible low calorie fat material having non-Newtonian pseudoplastic properties at body temperature; and (b) an edible, absorbable, digestible food material which acts as a solvent for the fat material. The rheological properties of the fat material are defined in terms of thixotropy, yield point, thixotropic area, and liquid/solid stability. The composition is useful as a fat substitute in low calorie food products. The composition provides a nonwaxy taste in the mouth, and a laxative side effect is avoided.

27 Claims, No Drawings

POLYOL FATTY ACID POLYESTER COMPOSITIONS WITH IMPROVED TASTE

RELATED APPLICATION

This application is a continuation of application Ser. No. 07/593,603, filed Oct. 4, 1990, now abandoned, which is a continuation of application Ser. No. 403,558, filed Sep. 6, 1989, now abandoned, which is a continuation of application Ser. No. 146,648, filed Jan. 21, 1988, now abandoned, which was a continuation-in-part of application Ser. No. 831,397, filed Feb. 20, 1986, now abandoned.

FIELD OF THE INVENTION

The present invention relates to edible compositions containing certain low calorie fat materials and additional ingredients to make the materials better tasting in the mouth.

BACKGROUND OF THE INVENTION

One of the most common metabolic problems among people today is obesity. This condition is primarily due to ingestion of a greater number of calories than are expended. Fat is the most concentrated form of energy in the diet, with each gram of fat supplying approximately 9 calories. Overall, fat constitutes about 40% of the total calories in the diet.

Triglycerides constitute about 90% of the total fat consumed in the average diet. One method by which the caloric value of edible fat could be lowered would be to decrease the amount of triglyceride that is absorbed in the human system since the usual edible triglyceride fats are almost completely absorbed (see *Lipids*, 2, H. J. Deuel, Interscience Publishers, Inc., New York 1955, page 215). A low calorie fat offers a convenient and practical method by which obesity can be prevented or overcome.

Low calorie fats which can replace triglycerides are described by Mattson et al. U.S. Pat. No. 3,600,186 to Mattson et al. discloses low calorie, fat-containing, food compositions in which at least a portion of the triglyceride content is replaced with a polyol fatty acid ester, said polyol fatty acid ester having at least four fatty acid ester groups with each fatty acid having from 8 to 22 carbon atoms.

U.S. Pat. No. 4,005,196 to Jandacek et al. discloses the low calorie fat-containing food compositions of the Mattson et al. patent, in combination with sufficient fat-soluble vitamin selected from the group consisting of vitamin A, vitamin D, vitamin E and vitamin K.

The esters disclosed in the Mattson et al. and Jandacek et al. patents are effective fat substitutes for use in low calorie food products. Unfortunately, regular ingestion of moderate to high levels of these esters can produce an undesirable "laxative" effect, namely, leakage of the ester through the anal sphincter. One way to prevent this undesirable laxative effect is to formulate the esters so that they are completely solid at body temperature.

Another means of preventing the undesirable laxative effect is through the addition to the ester of anti-anal leakage agents such as those described in U.S. Pat. No. 4,005,195 to Jandacek. This patent discloses anti-anal leakage agents which include solid fatty acids (melting point 37° C. or higher) and their triglyceride source, and solid polyol fatty acid polyesters. Specifically, the agents are selected from the group consisting of: edible $C_{12}$ and higher saturated fatty acids, and their edible salts; edible, digestible sources of $C_{12}$ and higher saturated fatty acids; edible, nonabsorbable, nondigestible solid polyol fatty acid polyesters having at least 4 fatty acid ester groups, wherein the polyol is selected from the group consisting of sugars and sugar alcohols containing from 4 to 8 hydroxyl groups and wherein each fatty acid group has from about 8 to about 22 carbon atoms; and edible, nondigestible esters of alpha-branched chain $C_{10}$–$C_{18}$ fatty acids.

The completely solid esters refered to above, and solid triglycerides or esters used as anti-anal leakage agents, have drawbacks when used in low calorie food compositions. An ester or triglyceride having a high solids content tastes "waxy" in the mouth when ingested. It would be desirable to have a substitute for triglyceride fats that is still effective at reducing calories, but that does not taste waxy in the mouth. At the same time, it is critical that this fat substitute not produce an undesired laxative effect.

It is therefore an object of the present invention to provide a composition, useful as a fat substitute in foods, which does not taste waxy in the mouth when ingested.

It is another object of this invention to provide a composition made with low calorie fat materials, so that food products made with the composition are low in calories.

It is a further object of the present invention to avoid a laxative side effect without having to add anti-anal leakage agents.

These and other objects of the invention will be made clear by the disclosure herein.

SUMMARY OF THE INVENTION

The present invention is a composition of matter having a Solid Fat Content less than about 20% at mouth temperature (92° F., 33.3° C.), comprising: (a) an edible, wholly or partially nondigestible low calorie fat material having, at 100° F. (37.8° C.): (i) a viscosity of at least about 2.5 poise at a shear rate of 800 seconds$^{-1}$, a viscosity of at least about 4.0 poise at a shear rate of 100 seconds$^{-1}$, and a viscosity of at least about 15.0 poise at a shear rate of 10 seconds$^{-1}$; (ii) a yield point of at least about 2,500 dynes/cm$^2$; (iii) a thixotropic area of at least about $0.20 \times 10^6$ dynes/cm$^2$-sec; and (iv) a liquid/solid stability of at least about 50%; and (b) an edible, absorbable, digestible food material which acts as a solvent for said fat material.

The invention also relates to the fat materials in combination with a food emulsifier capable of forming an oil-in-water emulsion with the fat materials in the mouth.

The compositions of this invention are useful as fat substitutes in low calorie fat-containing food products. The compositions provide a non-waxy taste in the mouth. At the same time, a laxative side effect is avoided without the use of anti-anal leakage agents.

DETAILED DESCRIPTION OF THE INVENTION

This invention relates to nonwaxy-tasting compositions useful as fata substitutes for making low calorie food products. The compositions do not produce an undesirable laxative side effect. Generally speaking, the invention involves the use of certain edible, wholly or partially nondigestible low calorie fat materials that are able to retain their viscosity and stability at relatively low solids content levels. Then, these fat materials are made even more palatable by adding either a food material that lowers the melting point of the composition or a food emulsifier capable of producing an oil-in-water emulsion with the fat materials.

It was discovered that some intermediate melting low calorie fat materials with pseudoplastic flow properties exhibit unique and unexpected rheology and liquid/solid stability at body temperature. These compositions behave as stable, homogeneous non-Newtonian pseudoplastic materials at body temperature. For example, specially synthesized sucrose fatty acid polyesters that were 12% solid and 88% liquid at body temperature (98.6° F., 37° C.) were very viscous and had excellent liquid/solid stability. This is in contrast to the properties of a mixture containing 88% liquid sucrose polyester and 12% solid sucrose polyester. At body temperature the mixture will separate into liquid and solid portions. Additionally, this mixture has a low viscosity. The specially synthesized sucrose polyesters, on the other hand, exhibit pseudoplastic flow and surprising viscosity and liquid/solid stability at relatively low levels of solids. The low calorie fat materials of this invention are though to be homogeneous systems. While not intended to be bound by theory, evidence of networking between the solid crystals of the materials has been discovered which may be involved in their surprisingly high liquid/solid stability and viscosity at body temperature.

A benefit of the fat materials' high viscosity and liquid/solid stability is that ingestion of them does not result in an undesirable laxative side effect. Being viscous and stable, the materials pass from the digestive tract through the anal sphincter in much the same manner as normal feces. Hence, the fat materials of this invention can be safely ingested without adding anti-anal leakage agents.

Another benefit accrues from the fact that the present fat materials are able to retain their high viscosity and stability at relatively low solids content levels. It has been found that they are capable of being ingested without a laxative side effect even at Solids Fat Content levels down to about 5%. When the fat substitute compositions are made with low solids content levels, less solids are perceived in the mouth when the compositions are eaten, so foods containing them taste less waxy.

The present invention relates to compositions containing these fat materials, in which additional ingredients are added to make compositions in which the taste of the fat materials is further improved.

A. Description of the Low Calorie Fat Materials

By "low calorie fat materials" is meant edible materials which can replace triglyceride fats or oils in the human diet. These materials provide the benefits of triglyceride fats and oils, i.e., lubricity and flavors.

By "wholly nondigestible" is meant that substantially all of the material is not digested by the body. It passes through the digestive system substantially the same as when it was ingested. The term "partially nondigestible" means that at least about 30% of the material is not digested. Preferably at least about 70% of the material is not digested.

By "liquid/solid stability" as used herein is meant that the liquid portion of the material does not readily separate from the solid portion at body temperature, i.e., the material appears to be a solid even though up to about 95% of it is liquid. Liquid/solid stability is measured by centrifuging a sample of the material at 60,000 rpm for one hour at 100° F. (37.8° C.). Liquid/solid stability is defined as: 100% minus percentage of the material that separated as a liquid after centrifuging.

The present invention is concerned with the rheology of the low calorie fat materials at body temperature (98.6° F., 37° C.) because they must be stable and viscous at body temperature to eliminate a laxative side effect. However, the measurements herein were done at 100° F. (37.8° C.) as a matter of convenience and for easier calibration of instruments, and the invention is defined in terms of properties at 100° F. (37.8° C.). It is understood that measurments done at 100° F. (37.8° C.) are very close to measurements at body temperature, and they conservatively state the rheological properties at body temperature since a lower temperature increases the viscosity.

The fat materials herein exhibit unexpected rheology and liquid/solid stability at body temperature. For example, specially synthesized intermediate melting sucrose fatty acid polyesters which are 12% solid and 88% liquid at body temperature exhibit non-Newtonian pseudoplastic flow properties, are very viscous and have excellent liquid/solid stability. This is in contrast to the properties of a mixture containing 88% of a liquid sucrose polyester and 12% of a solid sucrose polyester. At body temperature the mixture of 12% solid sucrose polyester and 88% liquid sucrose polyester separates into liquid and solid portions. Additionally, the mixture has a low viscosity. The specially synthesized sucrose polyesters, on the other hand, exhibit pseudoplastic flow and surprising viscosity and liquid/solid stability at relatively low levels of solids.

A benefit of the low calorie fat materials' high viscosity and liquid/solid stability is that ingestion of the materials does not result in an undesirable laxative side effect. Being viscous and stable, the materials pass from the digestive tract through the anal sphincter in much the same manner as normal feces. Hence, the materials of this invention can be safely ingested without adding anti-anal leakage agents.

Another benefit accrues from the fact that the present fat materials are able to retain their high viscosity and stability at relatively low solids content levels. When the compositions are ingested, less solids are preceived in the mouth, so the compositions taste less waxy.

The low calorie fat materials of this invention are thought to be homogenous systems. While not intended to be bound by theory, evidence of networking between the solid crystals and liquid of the materials has been discovered which may be involved in the surprisingly high liquid/solid stability and viscosity of the materials at body temperature.

The present invention, then, relates to a composition of matter comprising an edible, wholly or partially nondigestible low calorie fat material having physical chemical properties such that it has a non-Newtonian pseudoplastic rheology at 100° F. (37.8° C.). In particular, at 100° F. (37.8° C.) the fat material has: (a) a viscosity of at least about 2.5 poise at a shear rate of 800 seconds$^{-1}$, a viscosity of at least about 4.0 poise at a shear rate of 100 seconds$^{-1}$, and a viscosity of at least about 15.0 poise at a shear rate of 10 seconds$^{-1}$; (b) a yield point of at least about 2,500 dynes/cm$^2$; (c) a thixotropic area of at least about $0.20 \times 10^6$ dynes/cm$^2$-sec.; and (d) a liquid/solid stability of at least about 50%.

It is believed that the viscosity at the lower shear rate of 10 seconds$^{-1}$ is the rheology specification that most closely simulates the forces on the present compositions during digestion.

Viscosity, yield point, and thixotropic area are well known rheological properties, and can be measured by use of an instrument such as a plate and cone viscometer (e.g., a Ferranti-Shirley viscometer, manufactured by Ferranti Electric, Inc., 87 Modular Ave., Commack, NY 11725). The basics of rheology are discussed in Idson, "Rheology: Fundamental Concepts," Cosmetics and Toiletries, Vol. 93, pp. 23-30 (July 1978). "Viscosity" is a measure of the internal friction resisting the movement of each layer of fluid as it moves past an adjacent layer of fluid. The "yield value" is the amount of shearing stress that must be applied before a material will begin to flow. Idson defines "thixotropy" as a reversible gel-sol-gel transition caused by the building up of a definite structure within the material. The gelled structure upon shaking or stirring becomes a sol, which when allowed to remain undisturbed, becomes gelled again.

To measure viscosity, yield point, and thixotropic area of a sample of the fat material of this invention, a plate and cone viscometer is used to record a rheogram, which is a plot of shear stress versus shear rate. Viscosity and yield point are calculated from points on the rheogram curve, and the thixotropic area is the area within the curve (also known as the "hysteresis loop"). The discussion of this method in Idson is incorporated herein by reference. Additional details are provided below under the Analytical Methods section.

Preferably, at 100° F. (37.8° C.) the low calorie fat materials of this invention have a viscosity of at least about 5 poise at a shear rate of 800 seconds$^{-1}$, a viscosity of at least about 20 poise at a shear rate of 100 seconds$^{-1}$, and a viscosity of at least about 200 poise at a shear rate of 10 seconds$^{-1}$. The preferred yield point of the compositions is at least about 5,000 dynes/cm$^2$, and the preferred thixotropic area is at least about $0.75 \times 10^6$ dynes/cm$^2$-sec. Preferably, the compositions have a liquid/solid stability of at least about 90%.

Most preferably, at 100° F. (37.8° C.) the low calorie fat materials have a viscosity of at least about 8 poise at a shear rate of 800 seconds$^{-1}$, a viscosity of at least about 30 poise at a shear rate of 100 seconds$^{-1}$, and a viscosity of at least about 400 poise at a shear rate of 10 seconds$^{-1}$. The most preferred yield point of the compositions is at least about 15,000 dynes/cm$^2$, and the most preferred thixotropic area is at least about $1.00 \times 10^6$ dynes/cm$^2$-sec.

The preferred upper limit of the viscosity of the fat materials of this invention is about $1 \times 10^5$ poise at a shear rate of 10 seconds$^{-1}$, and about 1,000 poise at a shear rate of 100 seconds$^{-1}$. The fat materials must have pseudoplastic flow properties as defined herein.

Iodine Value is a measure of the degree of unsaturation of fatty acids. The low calorie fat materials of this invention preferably have an Iodine Value of from about 36 to about 55.

The Solid Fat Content value (SFC) provides a reasonable approximation of the percent by weight solids of a particular fatty material at a given temperature. The present low calorie fat material preferably has a Solid Fat Content at 100° F. (37.8° C.) of at least about 5%. Most preferably, the Solid Fat Content at 100° F. (37.8° C.) is at least about 10%. The low calorie fat material preferably has a complete melting point higher than about 98.6° F. (37° C.).

The low calorie fat materials of the present invention can be any of a variety of edible, wholly or partially nondigestible compounds. Preferably, the fat material is selected from the group consisting of polyol fatty acid polyesters and polycarboxylic acids esterified with fatty alcohols, and mixtures thereof. Preferred polyol fatty acid polyesters are sugar fatty acid polyesters, sugar alcohol fatty acid polyesters, and polyglycerol fatty acid polyesters, and mixtures thereof. More preferably, the fat material is selected from the group consisting of sugar fatty acid polyesters and sugar alcohol fatty acid polyesters, and mixtures thereof, the sugars and sugar alcohols containing from 4 to 8 hydroxyl groups.

Sugar or sugar alcohol fatty acid polyesters comprise sugars or sugar alcohols, and fatty acids. The term "sugar" is used herein in its conventional sense as generic to mono-and disaccharides. The term "sugar alcohol" is also used in its conventional sense as generic to the reduction product of sugars wherein the aldehyde or ketone group has been reduced to an alcohol. The fatty acid ester compounds are prepared by reacting a monosaccharide, disaccharide or sugar alcohol with fatty acids as discussed below.

Examples of suitable monosaccharides are those containing 4 hydroxyl groups such as xylose, arabinose, and ribose; the sugar alcohol derived from xylose, i.e., xylitol, is also suitable. The monosaccharide erythrose is not suitable for the practice of this invention since it only contains 3 hydroxyl groups; however, the sugar alcohol derived from erythrose, i.e. erythritol, contains 4 hydroxyl groups and is thus suitable. Among 5 hydroxyl-containing monosaccharides that are suitable for use herein are glucose, mannose, galactose, fructose, and sorbose. A sugar alcohol derived from sucrose, glucose, or sorbose, e.g., sorbitol, contains 6 hydroxyl groups and is also suitable as the alcohol moiety of the fatty acid ester compound. Examples of suitable disaccharides are maltose, lactose, and sucrose, all of which contain 8 hydroxyl groups.

In preparing sugar or sugar alcohol fatty acid polyesters of the present invention a sugar or sugar alcohol compound such as those identified above must be esterified with a mixture of fatty acids having from about 8 to about 22 carbon atoms. Examples of such fatty acids are caprylic, capric, lauric, myristic, myristoleic, palmitic, palmitoleic, stearic, oleic, ricinoleic, linoleic, linolenic, eleostearic, arachidic, behenic, and erucic. The fatty acids can be derived from suitable naturally occurring or synthetic fatty acids and can be saturated or unsaturated, including positional and geometric isomers. The fat materials of this invention are mixed esters of fatty acids, rather than esters of a single type of fatty acid.

Fatty acids per se or naturally occurring fats and oils can serve as the source for the fatty acid component in the sugar or sugar alcohol fatty acid ester. For example, rapeseed oil provides a good source for $C_{22}$ fatty acid. $C_{16}$-$C_{18}$ fatty acid can be provided by tallow, soybean oil, or cottonseed oil. Shorter chain fatty acids can be provided by coconut, palm kernel, or babassu oils. Corn oil, lard, olive oil, palm oil, peanut oil, safflower seed oil, sesame seed oil, and sunflower seed oil, are examples of other natural oils which can serve as the source of the fatty acid component.

The sugar or sugar alcohol fatty acid polyesters suitable for use herein can be prepared by a variety of methods well known to those skilled in the art. These method include: transesterification of the sugar or sugar alcohol with methyl, ethyl or glycerol fatty acid esters using a variety of catalysts; acylation of the sugar or sugar alcohol with a fatty acid chloride; acylation of the sugar or sugar alcohol with a fatty acid anhydride; and acylation of the sugar or sugar alcohol with a fatty acid, per se. As an example, the preparation of sugar and sugar alcohol fatty acid esters is described in U.S. Pat. No. 2,831,854.

A characterizing feature of the sugar or sugar alcohol fatty acid polyesters useful in this invention is that they predominantly contain at least 4 fatty acid polyester groups. Sugar or sugar alcohol fatty acid polyester compounds that contain 3 or less fatty acid ester groups are digested in the intestinal tract much in the manner as ordinary triglyceride fats, but sugar or sugar alcohol fatty acid polyester compounds that contain four or more fatty acid ester groups are digested to a lesser extent and thus have the desired low calorie properties for use in this invention.

Highly preferred low calorie fat materials according to this invention are sucrose fatty acid polyesters. Preferred sucrose fatty acid polyesters have the majority of their hydroxyl groups esterified with fatty acids. Preferably at least about 80%, and most preferably at least about 95%, of the sucrose fatty acid polyesters are selected from the group consisting of octaesters, heptaesters and hexaesters, and mixtures thereof. Preferably, no more than about 35% of the esters are hexaesters or heptaesters, and at least about 60% of the sucrose fatty acid polyesters are octaesters. Most preferably, at least about 70% of the polyesters are octaesters.

In order to provide the required physical properties, the sucrose fatty acid polyesters of this invention are preferably esterified with particular kinds of fatty acids. Preferably, at least about 80%, and most preferably at least about 90%, of the fatty acids are selected from the group consisting of mixtures of palmitic, stearic, oleic, linoleic, and behenic acids.

More specifically, the following is a preferred fatty acid composition: from about 9% to about 12% palmitic; from about 35% to about 53% stearic; from about 19% to about 43% oleic; from about 2% to about 17% linoleic; from about 0% to about 2% linolenic; from about 0% to about 2% arachidic; from about 0% to about 10% behenic; and from about 0% to about 2% erucic.

The following fatty acid composition is most preferred: from about 9% to about 12% palmitic; from about 42% to about 53% stearic; from about 19% from about 39% oleic; from about 2% to about 17% linoleic; from about 0% to about 2% linolenic; from about 0% to about 2% arachidic; from about 2% to about 10% behenic; and from about 0% to about 2% erucic.

Polyglycerol fatty acid polyesters can also be low calorie fat materials of the present invention. Polyglycerol is prepared by the polymerization of glycerine in the presence of either acid or base. The polyglycerols can contain from 2 to 20 glycerol moieties. Preferably, the polyglycerols will be those having from 2 to 15 glycerol moieties.

The polyglycerol compounds can be made by any synthetic method. See, for example, U.S. Pat. No. 3,968,169 to Seiden and Martin (1976). Esterification of the polyglycerols can also be done by any method known to the art, providing the resulting polyglycerol esters have the rheological properties required of the present invention.

Animal studies have now shown polyglycerol esters with the following rheological properties to be very effective at eliminating laxative side effect: (a) a viscosity of 3.13 poise at a shear rate of 800 seconds$^{-1}$, a viscosity of 5.18 poise at a shear rate of 100 seconds$^{-1}$, and a viscosity of 32.43 poise at a shear rate of 10 seconds$^{-1}$; (b) a thixotropic area of $0.246 \times 10^6$ dynes/cm$^2$-sec.; and (c) a liquid/solid stability of 53.45%.

The "polycarboxylic acids esterified with fatty alcohols" are tricarboxylic and tetracarboxylic acids and higher. The polycarboxylic acids can be partially or wholly esterified with fatty alcohols. At least three fatty alcohol ester groups must be on an acid molecule to make it partially nondigestible.

B. Methods for Making the Fat Materials Better Tasting

While the fat materials of this invention offer an improvement in non-waxy taste when used alone in a food product, this invention relates to methods for making the fat material even better-tasting than they are alone.

One method involves the use of an edible, absorbable, digestible food material which acts as a solvent for the fat material. It was discovered that by the addition of a food material such as a liquid triglyceride to the fat materials, the melting point of the materials is lowered, so that at mouth temperature (92° F., 33.3° C.) the fat materials have a Solid Fat Content less than about 20%. Hence, when the fat materials are ingested they do not taste waxy in the mouth. After being ingested, the food material that acts as a solvent is digested in the stomach and intestines, and the melting point reduction effect is thereby eliminated. The fat materials revert to their original solids content in the gastrointestinal tract. When the fat materials pass from the colon, then, they are viscous and stable enough to not cause a laxative side effect.

Therefore, one aspect of the present invention is a composition of matter having a Solid Fat Content less than about 20% at mouth temperature (92° F., 33.3° C.), comprising: (a) an edible, wholly or partially nondigestible low calorie fat material having, at 100° F. (37.8° C.): (i) a viscosity of at least about 2.5 poise at a shear rate of 800 seconds$^{-1}$, a viscosity of at least about 4.0 poise at a shear rate of 100 seconds$^{-1}$, and a viscosity of at least about 15.0 poise at a shear rate of 10 seconds$^{-1}$; (ii) a yield point of at least about 2,500 dynes/cm$^2$; (iii) a thixotropic area of at least about $0.20 \times 10^6$ dynes/cm$^2$-sec; and (iv) a liquid/solid stability of at least about 50%; and (b) an edible, absorbable, digestible food material which acts as a solvent for said fat material.

For very good non-waxy taste in the mouth, it is preferable that the composition have a Solid Fat Content less than about 10% at mouth temperature (92° F., 33.3° C.), and most preferably less than about 5%.

The edible, absorbable, digestible food material which acts as a solvent for the fat material is preferably selected from the group consisting of triglycerides, monoglycerides, diglycerides, substituted mono- and diglycerides, polyglycerol esters, citrus oils, flavorants, edible alcohols, edible food emulsifiers, and mixtures thereof. Most preferably, the food material is selected from the group consisting of triglycerides and substituted mono- and diglycerides, and mixtures thereof. By "substituted" mono- and diglycerides is meant mono- and diglycerides in which the free hydroxyl groups are substituted with edible short chain fatty acids, i.e., $C_2$ through $C_8$.

Edible food emulsifiers include mono- and diglycerides, lower sucrose esters ($C_1$-$C_4$), and lower polyglycerol esters ($C_1$-$C_4$).

The digestible food material must be capable of lowering the melting point (freezing point) of the fat materials. Freezing point depression generally follows the formula: $1/T = 1/T_o - (R \ln x/\text{delta } H_f)$, where $T$ = freezing point, $T_o$ = pure freezing point, $X$ = mole fraction, and delta $H_f$ = heat of fusion.

The amount and type of digestible food material used as a solvent will depend on the end food product in which the composition of this invention will be used. For example, a preferred food material for this purpose is triglycerides. In a margarine product what is desired is a low Solid Fat Content and a fairly low viscosity. There is an optimum viscosity so that the margarine is thin enough so that the saliva in the mouth can act on it and make it invert. If the margarine is too thin, it will disperse in the mouth before the saliva is able to act on it. As another example, shortening must have substantial plasticity because of its use in the areas of frying and baking. Yet, the shortening should not be so firm as to taste very firm in the mouth. In summary, a specific triglyceride or other food material is picked depending on the food product in which it will be used.

It has been discovered that particular ratios of triglyceride and fat material (in particular sucrose polyesters) are desirable in terms of calorie reduction. To maximize the calorie reduction benefit, from about 67% to about 90% of the sucrose polyester is combined with from about 33% to about 10% triglyceride. To obtain the minimum reduced calorie benefit that is allowed by current Government regulations, from about 33% to about 90% sucrose polyester is combined with from about 66% to about 10% triglyceride.

The other method of this invention, for making the low calorie fat materials even more palatable, comprises adding to the fat materials an edible, digestible food emulsifier capable of forming an oil-in-water emulsion with the fat materials in the mouth. Saliva from the mouth and any water in the food comprises the water portion of the emulsion, while the present fat material and any oil from the food comprises the oil part. When the fat material is made into an oil-in-water emulsion with saliva, it does not taste waxy in the mouth. After ingestion, the food emulsifier is digested while the fat material remains undigested, so the fat material reverts to its original form. A good-tasting food product can be made that does not produce a laxative side effect.

Tendency of an emulsifier to form an oil-in-water emulsion is measured by its hydrophilic/lipophilic balance (HLB). The emulsifier used in the composition of this invention must have an HLB value of at least 2.

Preferred food emulsifiers for use herein are selected from the group consisting of mono- and diglycerides, lower sucrose esters, lower polyglycerol esters, and mixtures thereof.

The compositions of the present invention can be used as a partial or total replacement for normal triglyceride fat in any fat-containing food composition to provide low calorie benefits. Very low calorie and thus highly desirable food compositions of the invention are obtained when the fat comprises up to about 100% of the low calorie fat materials of this invention, and from 25% to 100% of the calories.

The present compositions, and particularly compositions made with sucrose polyesters, are useful in a wide variety of food and beverage products. For example, the compositions can be used in the production of baked goods in any form, such as mixes, shelf-stable baked goods, and frozen baked goods. Possible applications include, but are not limited to, cakes, brownies, muffins, bar cookies, wafers, biscuits, pastries, pies, pie crusts, and cookies, including sandwich cookies and chocolate chip cookies, particularly the storage-stable dual-textured cookies described in U.S. Pat. No. 4,455,333 of Hong & Brabbs. The baked goods can contain fruit, cream, or other fillings. Other baked good uses include breads and rolls, crackers, pretzels, pancakes, waffles, ice cream cones and cups, yeast-raised baked goods, pizzas and pizza crusts, baked farinaceous snack foods and other baked salted snacks.

In addition to their uses in baked goods, the present compositions can be used alone or in combination with other regular, reduced calorie or zero calorie fats to make shortening and oil products. The other fats can be synthetic or derived from animal or vegetable sources, or combinations of these. Shortening and oil products include, but are not limited to, shortenings, margarines, spreads, butter blends, lards, cooking and frying oils, salad oils, popcorn oils, salad dressings, mayonnaise, and other edible oils.

The present compositions can also be fortified with vitamins and minerals, particularly the fat-soluble vitamins. The fat-soluble vitamins include vitamin A, vitamin D, vitamin E, and vitamin K. Vitamin A is a fat-soluble alcohol of the formula $C_{20}H_{29}OH$. Natural vitamin A is usually found esterified with a fatty acid; metabolically active forms of vitamin A also include the corresponding aldehyde and acid. Vitamin D is a fat-soluble vitamin well known for use in the treatment and prevention of rickets and other skeletal disorders. "Vitamin D" comprises sterols, and there are at least 11 sterols with vitamin D-type activity. Vitamin E (tocopherol) is a third fat-soluble vitamin which can be used in the present invention. Four different tocopherols have been identified (alpha, beta, gamma and delta), all of which are oily, yellow liquids, insoluble in water but soluble in fats and oils. Vitamin K exists in at least three forms, all belonging to the group of chemical compounds known as quinones. The naturally occurring fat-soluble vitamins are $K_1$ (phylloquinone), $K_2$ (menaquinone), and $K_3$ (menadione). The amount of the fat-soluble vitamins employed herein to fortify the present compositions can vary. If desired, the compositions can be fortified with a recommended daily allowance (RDA), or increment or multiple of an RDA, of any of the fat-soluble vitamins or combinations thereof.

Vitamins that are nonsoluble in fat can similarly be included in the present compositions. Among these vitamins are the vitamin B complex vitamins, vitamin C, vitamin G, vitamin H, and vitamin P. The minerals include the wide variety of minerals known to be useful in the diet, such as calcium, magnesium, and zinc. Any combination of vitamins and minerals can be used in the present low-calorie compositions.

The present compositions are particularly useful in combination with particular classes of food and beverage ingredients. For example, an extra calorie reduction benefit is achieved when the compositions are used with noncaloric or reduced calorie sweeteners alone or in combination with bulking agents. Noncaloric or reduced calorie sweeteners include, but are not limited to, aspartame; saccharin; alitame, thaumatin; dihydrochalcones; cyclamates; steviosides; glycyrrhizins, synthetic alkoxy aromatics, such as Dulcin and P-4000; sucrolose; suosan; miraculin; monellin; sorbitol; xylitol; talin; cyclohexylsulfamates; substituted imidazolines; synthetic sulfamic acids such as acesulfame, acesulfam-K and n-substituted sulfamic acids; oximes such as perilartine; rebaudioside-A; peptides such as aspartyl malonates and succanilic acids; dipeptides; amino acid based sweeteners such as gem-diaminoalkanes, meta-aminobenzoic acid, L-aminodicarboxylic acid alkanes, and amides of certain alpha-aminodicarboxylic acids and gem-diamines; and 3-hydroxy-4-alkyloxyphenyl aliphatic carboxylates or heterocyclic aromatic carboxylates.

The compositions of the present invention can be used in combination with other noncaloric or reduced calorie fats, such as branched chain fatty acid triglycerides, triglycerol ethers, polycarboxylic acid esters, sucrose polyethers, neopentyl alcohol esters, silicone oils/siloxanes, and dicarboxylic acid esters. Other partial fat replacements useful in combination with the present compositions are medium chain triglycerides, highly esterified polyglycerol esters, acetin fats, plant sterol esters, polyoxyethylene esters, jojoba esters, mono/diglycerides of fatty acids, and mono/diglycerides of short-chain dibasic acids.

Bulking or bodying agents are useful in combination with the present compositions in many foods or beverages. The bulking agents can be nondigestible carbohydrates, for example, polydextrose and cellulose or cellulose derivatives, such as carboxymethylcellulose, carboxyethylcellulose, hydroxypropylcellulose, methylcellulose and microcrystalline cellulose. Other suitable bulking agents include gums (hydrocolloids), starches, dextrins, fermented whey, tofu, maltodextrins, polyols, including sugar alcohols, e.g. sorbitol and mannitol, and carbohydrates, e.g. lactose.

Similarly, foods and beverages can be made that combine the present compositions with dietary fibers to achieve the combined benefits of each. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and man-made fibers (for examples, by bacterial synthesis). Commercial fibers such as purified plant cellulose, or cellulose flour, can also be used. Naturally occurring fibers include fiber from whole citrus peel, citrus albedo, sugar beets, citrus pulp and vesicle solids, apples, apricots, and watermelon rinds.

These dietary fibers may be in a crude or purified form. The dietary fiber used may be of a single type (e.g. cellulose), a composite dietary fiber (e.g. citrus albedo fiber containing cellulose and pectin), or some combination of fibers (e.g. cellulose and a gum). The fibers can be processed by methods known to the art.

Of course, judgment should be exercised to make appopriate use of the present compositions and combinations of the compositions with other food ingredients. For example, a combination of sweetener with the present compositions would not be used where the specific benefits of the two are not desired. The present compositions and composition/ingredient combinations are used where appropriate, and in the proper amounts.

Many benefits are obtained from the use of the present compositions in foods and beverages, either when used alone or in combination with the ingredients discussed above. A primary benefit is the calorie reduction achieved when the present compositions are used as a total or partial fat replacement. This calorie reduction can be increased by using combinations of the present compositions with reduced calorie sweeteners, bulking agents, or other reduced calorie or noncaloric fats. Another benefit which follows from this use is a decrease in the total amount of fats in the diet. Foods or beverages made with the present compositions instead of triglyceride fats will also contain less cholesterol, and the ingestion of these foods can lead to reduced serum cholesterol and thus reduced risk of heart disease.

A related benefit is that the use of the present compositions allows the production of foods and beverages that are stable in terms of shelf stability and penetration stability. Foods and beverages made with the compositions have acceptable organoleptic properties, particularly taste and texture.

Dietary foods can be made with the present compositions, to meet special dietary needs, for example, of persons who are obese, diabetic or hypercholesterolemic. The compositions can be a major part of a low-fat, low-calorie, low-cholesterol diet, and they can be used alone or in combination with drug therapy or other therapy. Combinations of food or beverage products made with the present compositions can be used as part of a total dietary management regimen, based on one or more of these products, containing the compositions alone or in combination with one or more of the above-mentioned ingredients, to provide one or more of the above-mentioned benefits.

This discussion of the uses, combinations, and benefits of the present compositions, is not intended to be limiting or all-inclusive. It is contemplated that other similar uses and benefits can be found that will fall within the spirit and scope of this invention.

Analytical Methods

I. Rheology Measurements

A. Sample Preparation

The low calorie fat material is melted in a microwave oven at about 150° F. (66° C.) to about 170° F. (77° C.). This takes approximately 2 minutes. The melted fat material is held at 100° F. ±2° F. (37.8° C.±1° C.), and a 3 gram sample is weighed into a Solo ® plastic souffle cup. The sample is then allowed to recrystallize at 100° F. ±2° F. (37.8° C. ±1° C.) for 24 hours. After the 24 hour time period has elapsed, the sample is taken to the viscometer in an insulated cup and the viscosity is measured.

B. Ferranti-Shirley Viscometer Operation Procedure

A Ferranti-Shirley viscometer is used for the viscosity, yield point, and thixotropic area measurements. A cone is put into place, and the viscometer temperature is adjusted to 100° F. (37.8° C.). The chart recorder is calibrated, and the gap between the cone and plate is set. The cone speed is checked, and the cone and plate temperatures are equilibrated to 100° F. (37.8° C.). The panel controls are set. Sufficient sample is placed between the plate and the cone so that the gap is completely filled. The temperature is allowed to stabilize at 100° F. (37.8° C.) for about 30 seconds, and then the cone rotation and recording are started. A rheogram for the fat material is recorded and analyzed to determine the viscosity, yield point, and thixotropic area. The viscometer is programmed to ramp up in shear rate continuously from 0 to 800 seconds$^{-1}$ in 120 seconds, then ramp down in shear rate from 800 to 0 seconds$^{-1}$ in 120 seconds. Viscosity is measured at shear rates of 800 seconds$^{-1}$, 100 seconds$^{-1}$, and 10 seconds$^{-1}$ on the increasing shear rate ramp. The viscosities at 10 seconds$^{-1}$ and 100 seconds$^{-1}$ are determined from a line drawn from the viscosity at 800 seconds$^{-1}$ down the straight line portion of the increasing shear rate ramp.

II. Liquid/Solid Stability Measurement

The sample is heated until it completely melts and is thoroughly mixed. The sample is then poured into centrifuge tubes to capacity at 100° F.±2° F. (37.8° C.±1° C.). The samples then are allowed to recrystallize for 24 hours at 100° F.±2° F. (37.8° C.±1° C.). The samples are then centrifuged at 60,000 rpm in a Beckman Model L8 70M centrifuge having a Beckman Model SW 60 head (Beckman Instruments, Palo Alto, Calif.) for one hour at 100° F. (37.8° C.). The minimum force on the samples is 254,000 g's, and the maximum force (i.e., the force at the bottom of the test tube) is 485,000 g's. The percent liquid separated is then measured by comparing the relative heights of the liquid and solid phases.

III. Solid Fat Content Measurement

Before determining SFC values, the fat material sample is heated to a temperature of 158° F. (70° C.) or higher for at least 0.5 hours or until the sample is completely melted. The melted sample is then tempered according to A.O.C.S. official Method Cd 16-81. After tempering, the SFC value of the fat material at a temperature of 100° F. (37.8° C.) and other desired temperatures is determined by pulsed nuclear magnetic resonance (PNMR). The method for determining SFC values of a fat by PNMR is described in Madison and Hill, *J. Amer. Oil. Chem. Soc.*, Vol. 55 (1978), pp. 328–31 and A.O.C.S. official Method Cd 16-81 (herein incorporated by reference).

The following Examples are intended to be further illustrative but not limiting of the present invention.

EXAMPLE 1

Methyl esters of a fully hydrogenated soy oil and a touch-hardened soy oil, blended in a 55/45 ratio (16 kg), and 2 kg. of an 15 wt. percent solution of potassium hydroxide in methanol are mixed in a stainless steel batch reactor. This mixture is then heated to 86° F. (30° C.) with agitation for 1 to 2 hours at atmospheric pressure. During this time, a portion of the methyl esters are saponified. A vacuum is then pulled on the system to remove the last traces of methanol.

Powdered sucrose (3 kg.) is added to the soap/ester mixture to give a 5:1 molar ratio of ester to sucrose. Potassium carbonate is then added to the mixture (approx. 0.5 wt. percent of the reaction mix) to catalyze the transesterification. This mixture is agitated and heated under vacuum at about 275° F. (135° C.) for up to 2½ hours to form the mono-, di- and trisucrose esters. Small quantities of tetra- and pentaesters are also formed during this stage. Additional methyl ester (19.5 kg) which has been preheated to 275° F. (135° C.) is added to bring and maintain the molar ratio of the esters to sucrose to 12:1. When the reaction conditions stabilize at 275° F. (135° C.), a nitrogen sparge is used to improve agitation and promote methanol stripping. As the reaction occurs, the reaction mixture becomes viscous and then thins out. This second reaction stage lasts approximately 4 to 8 hours.

After the reaction mixture has become thin, it is cooled to between 149° F. (65° C.) and 185° F. (85° C.). The crude reaction mixture is agitated with a dilute solution of methanol, sodium chloride and water. The volume of this wash solution is equal to 20% to 40% of the reaction mixture volume. The mixed phases are then allowed to settle for approximately 30 to 60 minutes. The lower settled phase which contains the soaps, excess sugars and methanol is drawn off and discarded. The upper settled phase which comprises the refined sucrose polyesters is washed again. Usually 2 to 4 washes are used.

The sucrose polyesters are then washed with a 1% glacial acetic acid in water solution at 10% to 20% of the volume of the reaction mix. This is followed by water wash of the same volume.

The reaction mix is then dried to remove moisture at 176° F. (80° C.) under 10 mm Hg or less vacuum for 30 to 60 minutes. Filtrol 105 (0.5 wt. percent), and a filter aid (0.5 wt. percent) are added and the mix is agitated at 167° F. (75° C.) to 185° F. (85° C.). The slurry is separated by filtration or other means until there is less than 0.1 wt. percent fines. The liquid is then passed through a 1 micromillimeter filter.

The refined and bleached reaction mix is put into a stainless steel batch deodorizer to distill off the bulk of the methyl esters. The distillation takes place at 374° F. (190° C.) to 482° F. (250° C.) under approximately 5 mm Hg of vacuum. This step is complete when it is visually evident that the distillation has slowed down.

The sucrose polyester is then deodorized in a stainless steel batch deodorizer or other suitable device at 374° F. (190° C.) to 482° F. (250° C.) under a vacuum of about 5 mm Hg with steam sparging. Deodorization is continued until the methyl ester content is below 200 ppm. The deodorizer contents are then cooled while using inert gas sparging. After cooling to 149° F. (65° C.), the deodorizer is brought to atmospheric pressure. The sucrose polyester is stored in clean stainless steel drums.

This produces a sucrose polyester product having the fatty acid composition specified in Table I. Rheology and effectiveness at preventing laxative side effect are listed in Table II.

The results shown in Tables I and II illustrate that sucrose polyesters prepared according to Example 1 have the properties of the low calorie fat materials of the present invention. The second column in Table I shows the properties of a liquid sucrose polyester prepared according to a method known to the art, and not falling within the present invention.

Table II compares the rheology and effectiveness at preventing laxative side effect of the two samples. Example 1 has rheological properties according to this invention; the liquid sucrose polyester does not. The liquid sucrose polyester results in a 15% oil loss when ingested. By contrast, the sucrose polyesters prepared in Example 1 result in 0% oil loss, showing that they are very effective at eliminating laxative side effect.

When the sucrose polyester of Example 1 are mixed with triglyceride in a ratio of 75% sucrose polyester and 25% triglyceride, a composition is made that tastes very good when ingested and that does not cause a laxative side effect.

TABLE I

| | Sucrose Polyester Composition | |
|---|---|---|
| | Example 1 | Liquid Sucrose Polyester |
| Fatty Acid Composition | % | % |

TABLE I-continued

| Sucrose Polyester Composition | Example 1 | Liquid Sucrose Polyester |
|---|---|---|
| Others | 2.6 | 3.4 |
| $C_{16}$ | 9.4 | 8.6 |
| $C_{18}$ | 51.8 | 5.7 |
| $C_{18:1}$ | 20.4 | 45.6 |
| $C_{18:2}$ | 15.8 | 31.7 |
| $C_{18:3}$ | 0 | 0.4 |
| $C_{20}$ | 0 | 0.6 |
| $C_{22}$ | 0 | 0.0 |
| I.V. | 47.6 | 110 |
| Ester Distribution | % | % |
| Octa | 79.0 | 71.1 |
| Hepta | 19.2 | 24.0 |
| Hexa | 1.8 | 4.9 |
| Penta | 0.1 | 0.1 |
| <Penta | 0.1 | 0.1 |
| SFC Profile | % | % |
| 50 F. | 64.3 | 0 |
| 70 F. | 53.6 | 0 |
| 80 F. | 43.0 | 0 |
| 92 F. | 21.1 | 0 |
| 105 F. | 2.7 | 0 |
| 98.6 F.* | 11.9 | 0 |
| DSC Behavior | C. | C. |
| Complete Melt Point | 42.5 | −20.0 |
| Maximum Melt Point | 39.4 | −35.0 |
| Heat of Fusion | 11.7 gal./g. | 10.6 gal./g. |

*SFC at 98.6 F. is interpolated from the values at 92 F. and 105 F.

TABLE II

Comparison of Physical Properties of the Sucrose Polyesters with Effectiveness Against Laxative Side Effect

| | LSE Effectiveness | Rheology | | | | | Liq/Solid |
|---|---|---|---|---|---|---|---|
| | | Viscosity (poise) | | | | Thixotropic | |
| | Oil Loss (%) | 800 (sec.$^{-1}$) | 100 (sec.$^{-1}$) | 10 (sec.$^{-1}$) | Yield Point (dynes/cm$^2$) | Area (dynes/cm$^2$-sec.) | Stability (100%-% Sep.) |
| EFFECTIVE: Example 1 | 0 | 8.2 | 38.9 | 370 | 13,997 | 1.324 × 10$^6$ | 100 |
| INEFFECTIVE: Liquid Sucrose Polyester | 15 | 2.1 | 2.1 | 2 | None | None | -NA- |

What is claimed is:

1. A better tasting fat substitute composition resistant to laxative side effect comprising:
   (a) from about 33% to about 90% edible, wholly or partially nondigestible low calorie fat material selected from the group consisting of sucrose fatty acid polyesters with an octaester content of at least about 70%, xylose fatty acid polyesters, arabinose fatty acid polyester, ribose fatty acid polyesters, glucose fatty acid polyesters, mannose fatty acid polyesters, galactose fatty acid polyesters, fructose fatty acid polyesters, sorbose fatty acid polyesters, maltose fatty acid polyesters, lactose fatty acid polyesters, sugar alcohol fatty acid polyesters, and mixtures thereof, wherein the sugar alcohols contain from 4 to 8 hydroxyl groups, wherein the fatty acid polyesters have at least 4 fatty acid ester groups, wherein the fatty acids are mixtures of fatty acids selected from the group of fatty acids containing from about 8 to about 22 carbon atoms, and wherein the fat material has, at 100° F. (37.8° C.):
   (i) a viscosity of at least about 2.5 poise at a shear rate of 800 seconds$^{-1}$, a viscosity of at least about 4.0 poise at a shear rate of 100 seconds$^{-1}$, and a viscosity of at least about 15.0 poise at a shear rate of 10 seconds$^{-1}$; and
   (ii) a liquid/solid stability of at least about 90%; and
   (b) from about 10% to about 66% edible, absorbable, digestible food material which acts as a solvent for the fat material;
wherein the better tasting fat substitute composition has a solid fat content less than about 20% at mouth temperature (92° F., 33.3° C.).

2. A better tasting fat substitute composition resistant to laxative side effect comprising:
   (a) from about 33% to about 90% edible, wholly or partially nondigestible low calorie fat material selected from the group consisting of sucrose fatty acid polyesters with an octaester content of at least about 60%, xylose fatty acid polyesters, arabinose fatty acid polyesters, ribose fatty acid polyesters, glucose fatty acid polyesters, mannose fatty acid polyesters, galactose fatty acid polyesters, fructose fatty acid polyesters, sorbose fatty acid polyesters, maltose fatty acid polyesters, lactose fatty acid polyesters, sugar alcohol fatty acid polyesters, and mixtures thereof, wherein the sugar alcohols contain from 4 to 8 hydroxyl groups, wherein the fatty acid polyesters have at least 4 fatty acid ester groups with each fatty acid group having from about 8 to about 22 carbon atoms, and wherein the fat material has:
   (i) at 100° F. (37.8° C.), a viscosity of at least about 2.5 poise at a shear rate of 800 seconds$^{-1}$, a viscosity of at least about 4.0 poise at a shear rate of 100 seconds$^{-1}$, and a viscosity of at least about 15.0 poise at a shear rate of 10 seconds$^{-1}$;
   (ii) at 100° F. (37.8° C.), a liquid/solid stability of at least about 50%; and
   (iii) at 92° F. (33.3° C.), a solid fat content of not more than about 21%; and
   (b) from about 10% to about 66% edible, absorbable, digestible food material which acts as a solvent for the fat material;
wherein the better tasting fat substitute composition has a solid fat content less than about 20% at mouth temperature (92° F., 33.3° C.).

3. A better tasting fat substitute composition resistant to laxative side effect comprising:
   (a) from about 33% to about, 90% edible, wholly or partially nondigestible low calorie fat material selected from the group consisting of sucrose fatty acid polyesters with an octaester content of at least about 60%, xylose fatty acid polyesters, arabinose fatty acid polyesters, ribose fatty acid polyesters, glucose fatty acid polyesters, mannose fatty acid polyesters, galactose fatty acid polyesters, fructose fatty acid polyesters, sorbose fatty acid polyesters, maltose fatty acid polyesters, lactose fatty acid polyesters, sugar alcohol fatty acid polyesters, and mixtures thereof, wherein the sugar alcohols contain from 4 to 8 hydroxyl groups, wherein the fatty acid polyesters have at least 4 fatty acid ester groups, wherein the fatty acids are mixtures of fatty acids selected from the group of fatty acids containing from about 8 to about 22 carbon atoms, and wherein the fat material has:

(i) at 100° F. (37.8° C.), a viscosity of at least about 2.5 poise at a shear rate of 800 seconds$^{-1}$, a viscosity of at least about 4.0 poise at a shear rate of 100 seconds$^{-1}$, and a viscosity of at least about 15.0 poise at a shear rate of 10 seconds$^{-1}$;
  (ii) at 100° F. (37.8° C.), a liquid/solid stability of at least about 50%; and
  (iii) at 98.6° F. (37° C.), a solid fat content of not more than about 12%; and
 (b) from about 10% to about 66% edible, absorbable, digestible food material which acts as a solvent for the fat material;
wherein the better tasting fat substitute composition has a solid fat content less than about 20% at mouth temperature (92° F., 33.3° C.).

4. A better tasting fat substitute composition resistant to laxative side effect comprising:
  (a) from about 67% to about 90% edible, wholly or partially nondigestible low calorie fat material selected from the group consisting of sucrose fatty acid polyesters with an octaester content of at least about 60%, xylose fatty acid polyesters, arabinose fatty acid polyesters, ribose fatty acid polyesters, glucose fatty acid polyesters, mannose fatty acid polyesters, galactose fatty acid polyesters, fructose fatty acid polyesters, sorbose fatty acid polyesters, maltose fatty acid polyesters, lactose fatty acid polyesters, sugar alcohol fatty acid polyesters, and mixtures thereof, wherein the sugar alcohols contain from 4 to 8 hydroxyl groups, wherein the fatty acid polyesters have at least 4 fatty acid ester groups, wherein the fatty acids are mixtures of fatty acids selected from the group of fatty acids containing from about 8 to about 22 carbon atoms, and wherein the fat material has, at 100° F. (37.8° C.):
    (i) a viscosity of at least about 2.5 poise at a shear rate of 800 seconds$^{-1}$, a viscosity of at least about 4.0 poise at a shear rate of 100 seconds$^{-1}$, and a viscosity of at least about 15.0 poise at a shear rate of 10 seconds$^{-1}$; and
    (ii) a liquid/solid stability of at least about 50%; and
  (b) from about 10% to about 33% edible, absorbable, digestible food material which acts as a solvent for the fat material;
wherein the better tasting fat substitute composition has a solid fat content less than about 10% at mouth temperature (92° F., 33.3° C.).

5. A composition according to claim 1 wherein the composition comprises from about 67% to about 90% nondigestible fat material and from about 10% to about 33% digestible food material.

6. A composition according to claim 2 wherein the composition comprises from about 67% to about 90% nondigestible fat material and from about 10% to about 33% digestible food material.

7. A composition according to claim 3 wherein the composition comprises from about 67% to about 90% nondigestible fat material and from about 10% to about 33% digestible food material.

8. A composition according to any of claims 5-7 wherein the composition has a Solid Fat Content less than about 10% at mouth temperature (92° F., 33.3° C.).

9. A composition according to any of claims 4 or 5-7 wherein the digestible food material is a triglyceride.

10. A composition according to any of claims 4 or 6-7 wherein the fat material has a liquid/solid stability of at least about 90%.

11. A composition according to any of claims 4 or 5-7 wherein the fat material comprises sucrose fatty acid polyesters.

12. A composition according to claim 11 wherein at least about 80% of the fatty acids of the sucrose fatty acid polyesters are mixtures of fatty acids selected from the group consisting of palmitic, stearic, oleic, linoleic, and behenic acids.

13. A food composition comprising non-fat ingredients and fat ingredients, wherein up to about 100% of the total fat ingredients is a composition according to any of claims 4 or 5-7 and wherein the food is selected from the group consisting of margarine, shortening, cooking oil, salad dressing, cookies and cake.

14. A composition according to any of claims 4 or 5-7 wherein the low calorie fat material additionally has, at 100° F. (37.8° C.), a yield point of at least about 2,500 dynes/cm$^2$.

15. A composition according to any of claims 4 or 5-7 wherein the low calorie fat material additionally has, at 100° F. (37.8° C.), a thixotropic area of at least about 0.20 × 10$^6$ dynes/cm$^2$-second.

16. A better tasting fat substitute composition resistant to laxative side effect comprising:
  (a) an edible, wholly or partially nondigestible low calorie fat material selected from the group consisting of sucrose fatty acid polyesters with an octaester content of at least about 70%, xylose fatty acid polyesters, arabinose fatty acid polyesters, ribose fatty acid polyesters, glucose fatty acid polyesters, mannose fatty acid polyesters, galactose fatty acid polyesters, fructose fatty acid polyesters, sorbose fatty acid polyesters, maltose fatty acid polyesters, lactose fatty acid polyesters, sugar alcohol fatty acid polyesters, and mixtures thereof, wherein the sugar alcohols contain from 4 to 8 hydroxyl groups, wherein the fatty acid polyesters have at least 4 fatty acid ester groups, wherein the fatty acids are mixtures of fatty acids selected from the group of fatty acids containing from about 8 to about 22 carbon atoms, and wherein the fat material has, at 100° F. (37.8° C.):
    (i) a viscosity of at least about 2.5 poise at a shear rate of 800 seconds$^{-1}$, a viscosity of at least about 4.0 poise at a shear rate of 100 seconds$^{-1}$, and a viscosity of at least about 15.0 poise at a shear rate of 10 seconds$^{-1}$; and
    (ii) a liquid/solid stability of at least about 50%; and
  (b) an effective amount of a digestible food emulsifier to form an oil-in-water emulsion of the low calorie fat material with saliva in the human mouth, wherein the emulsifier has an HLB value of at least 2.

17. A better tasting fat substitute composition resistant to laxative side effect comprising:
(a) an edible, wholly or partially nondigestible low calorie fat material selected from the group consisting of sucrose fatty acid polyesters with an octaester content of at least about 60%, xylose fatty acid polyesters, arabinose fatty acid polyesters, ribose fatty acid polyesters, glucose fatty acid polyesters, mannose fatty acid polyesters, galactose fatty acid polyesters, fructose fatty acid polyesters, sorbose fatty acid polyesters, maltose fatty acid polyesters, lactose fatty acid polyesters, sugar alcohol fatty acid polyesters, and mixtures thereof, wherein the sugar alcohols contain from 4 to 8 hydroxyl groups, wherein the fatty acid polyesters have at least 4 fatty acid ester groups, wherein the fatty acids are mixtures of fatty acids selected from the group of fatty acids containing from about 8 to about 22 carbon atoms, and wherein the fat material has:
  (i) at 100° F. (37.8° C.), a viscosity of at least about 2.5 poise at a shear rate of 800 seconds$^{-1}$, a viscosity of at least about 4.0 poise at a shear rate of 100 seconds$^{-1}$, and a viscosity of at least about 15.0 poise at a shear rate of 10 seconds$^{-1}$;
  (ii) at 100° F. (37.8° C.), a liquid/solid stability of at least about 50%; and
  (iii) at 92° F. (33.3° C.), a solid fat content of not more than about 21%; and
(b) an effective amount of a digestible food emulsifier to form an oil-in-water emulsion of the low calorie fat material with saliva in the human mouth, wherein the emulsifier has an HLB value of at least 2.

18. A better tasting fat substitute composition resistant to laxative side effect comprising:
(a) an edible, wholly or partially nondigestible low calorie fat material selected from the group consisting of sucrose fatty acid polyesters with an octaester content of at least about 60%, xylose fatty acid polyesters, arabinose fatty acid polyesters, ribose fatty acid polyesters, glucose fatty acid polyesters, mannose fatty acid polyesters, galactose fatty acid polyesters, fructose fatty acid polyesters, sorbose fatty acid polyesters, maltose fatty acid polyesters, lactose fatty acid polyesters, sugar alcohol fatty acid polyesters, and mixtures thereof, wherein the sugar alcohols contain from 4 to 8 hydroxyl groups, wherein the fatty acid polyesters have at least 4 fatty acid ester groups, wherein the fatty acids are mixtures of fatty acids selected from the group of fatty acids containing from about 8 to about 22 carbon atoms, and wherein the fat material has:
  (i) at 100° F. (37.8° C.), a viscosity of at least about 2.5 poise at a shear rate of 800 seconds$^{-1}$, a viscosity of at least about 4.0 poise at a shear rate of 100 seconds$^{-1}$, and a viscosity of at least about 15.0 poise at a shear rate of 10 seconds$^{-1}$;
  (ii) at 100° F. (37.8° C.), a liquid/solid stability of at least about 50%; and
  (iii) at 98.6° F. (37° C.), a solid fat content of not more than about 12%; and
(b) and effective amount of a digestible food emulsifier to form an oil-in-water emulsion of the low calorie fat material with saliva in the human mouth, wherein the emulsifier has an HLB value of at least 2.

19. A composition according to claims 16, 17 or 18 wherein the food emulsifier is selected from the group consisting of mono- and diglycerides, lower sucrose esters, lower polyglycerol esters, and mixtures thereof.

20. A composition according to claims 16, 17 or 18 wherein the fat material comprises sucrose fatty acid polyesters.

21. A composition according to claim 20 wherein at least about 80% of the fatty acids of the sucrose fatty acid polyesters are mixtures of fatty acids selected from the group consisting of palmitic, stearic, oleic, linoleic, and behenic acids.

22. A food composition comprising non-fat ingredients and fat ingredients, wherein up to about 100% of the total fat ingredients is a composition according to any of claims 16, 17 or 18 and wherein the food is selected from the group consisting of margarine, shortening, cooking oil, salad dressing, cookies and cake.

23. A composition according to claims 16, 17 or 18 wherein the fat material has a liquid/solid stability of at least about 90%.

24. A composition according to claim 16, 17 or 18 wherein the low calorie fat material additionally has, at 100° F. (37.8° C.), a yield point of at least about 2,500 dynes/cm$^2$.

25. A composition according to claim 16, 17 or 18 wherein the low calorie fat material additionally has, at 100° F. (37.8° C.), a thixotropic area of at least about 0.20×10$^6$ dynes/cm$^2$-second.

26. A composition according to any of claims 4 or 5–7 wherein the low calorie fat material additionally has a viscosity at 100° F. (37.8° C.) of not more than about 100,000 poise at a shear rate of 10 seconds$^{-1}$.

27. A composition according to any of claims 16, 17 or 18 wherein the low calorie fat material additionally has a viscosity at 100° F. (37.8° C.) of not more than about 100,000 poise at a shear rate of 10 seconds$^{-1}$.

* * * * *